(12) United States Patent
Asgekar et al.

(10) Patent No.: US 8,966,036 B1
(45) Date of Patent: Feb. 24, 2015

(54) METHOD AND SYSTEM FOR WEBSITE USER ACCOUNT MANAGEMENT BASED ON EVENT TRANSITION MATRIXES

(75) Inventors: Amogh Asgekar, Navi Mumbai (IN); Kiran Singh Panesar, Bangalore (IN); Finnegan Southey, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1128 days.

(21) Appl. No.: 12/954,470

(22) Filed: Nov. 24, 2010

(51) Int. Cl.
*G06F 15/173* (2006.01)
*G06F 7/00* (2006.01)

(52) U.S. Cl.
USPC ............................ 709/223; 709/226; 707/706

(58) Field of Classification Search
CPC .... G06Q 50/01; H04L 67/22; H04N 21/4532; G06F 13/00; G06F 12/00
See application file for complete search history.

(56) References Cited

U.S. PATENT DOCUMENTS

| | | | | |
|---|---|---|---|---|
| 6,928,474 | B2 * | 8/2005 | Venkatesan | 709/224 |
| 6,964,023 | B2 * | 11/2005 | Maes et al. | 715/811 |
| 7,194,466 | B2 * | 3/2007 | Chen et al. | 1/1 |
| 7,594,271 | B2 * | 9/2009 | Zhuk et al. | 726/24 |
| 7,698,300 | B2 * | 4/2010 | Yamamoto | 707/999.107 |
| 8,356,001 | B2 * | 1/2013 | Collazo | 706/14 |
| 2002/0124075 | A1 * | 9/2002 | Venkatesan | 709/224 |
| 2006/0218278 | A1 * | 9/2006 | Uyama et al. | 709/226 |
| 2008/0243827 | A1 * | 10/2008 | Sarma et al. | 707/5 |
| 2009/0070334 | A1 * | 3/2009 | Callahan et al. | 707/9 |
| 2010/0027663 | A1 * | 2/2010 | Dai et al. | 375/240.16 |
| 2010/0205261 | A1 * | 8/2010 | Michel | 709/206 |

OTHER PUBLICATIONS

Xiano et al. "Clustering of Web Users Using Session-based Similarity Measures".*
Perdisci et al. "Behavioral Clustering of HTTP-Based Malware and Signature Generation Using Malicious Network Traces" a College of Computing, Georgia Institute of Technology; Publication Date : Apr. 28, 2010.*
Xiao et al. "Clustering of Web Users Using Session-based Similarity Measures "—Date of Conference :2001.*
Nasraoui et al . "Mining Web Access Logs Using Relational Competitive Fuzzy Clustering"—Date of Conference: Aug. 17, 1999.*

* cited by examiner

*Primary Examiner* — Joshua Joo
*Assistant Examiner* — Younes Naji
(74) *Attorney, Agent, or Firm* — Morgan, Lewis & Bockius LLP (57) ABSTRACT

A method for categorizing multiple users of a website based on their respective transition patterns between successive types of user activities is implemented at a computing device having one or more processors and memory. After receiving one or more log files from a data source, the computing device generates respective event transition matrixes for multiple users in accordance with the users' event records such that each element of each respective event transition matrix includes a probability of an occurrence of two consecutive event types A and B for the same user. Based on an analysis of the multiple users' event transition matrixes, the computing device categorizes the multiple users into at least two distinct groups of users and performs one or more operations to the website's user accounts associated with one or more users from one of the groups.

24 Claims, 8 Drawing Sheets

Event Transition Count Table 153

| Event Types | Event Type A | Event Type B | ... | Event Type Z |
|---|---|---|---|---|
| Event Type A | 8 | 120 | ... | 34 |
| Event Type B | 53 | 74 | ... | 3 |
| ... | ... | ... | ... | ... |
| Event Type Z | 1190 | 0 | ... | 12 |

FIG. 2B

Event Transition Matrix Table 155

| Event Types | Event Type A | Event Type B | ... | Event Type Z |
|---|---|---|---|---|
| Event Type A | $(P_{AA}, C_{AA})$ | $(P_{AB}, C_{AB})$ | ... | $(P_{AZ}, C_{AZ})$ |
| Event Type B | $(P_{BA}, C_{BA})$ | $(P_{BB}, C_{BB})$ | ... | $(P_{BZ}, C_{BZ})$ |
| ... | ... | ... | ... | ... |
| Event Type Z | $(P_{ZA}, C_{ZA})$ | $(P_{ZB}, C_{ZB})$ | ... | $(P_{ZZ}, C_{ZZ})$ |

FIG. 2C

User Similarity Metric Table 157

| User Accounts | User A | User B | ... | User Z |
|---|---|---|---|---|
| User A | N/A | 5.1 | ... | 0.5 |
| User B | 11.9 | N/A | ... | 2.3 |
| ... | ... | ... | ... | ... |
| User Z | 8.2 | 0.7 | ... | N/A |

METHOD AND SYSTEM FOR WEBSITE USER ACCOUNT MANAGEMENT BASED ON EVENT TRANSITION MATRIXES

TECHNICAL FIELD

The disclosed embodiments relate generally to computer network security, and in particular, to methods and systems for managing user accounts at a website based on multiple users' event transition matrixes.

BACKGROUND

Internet websites that offer services such as social networking or content sharing typically have ten of thousands of registered users and record a large volume of user activities in their log files on a daily basis. Analyzing trends in the behavior of these users presents significant challenges. For example, analyzing transition patterns between types of user activities is considerably more complicated than simply characterizing types of user activities.

SUMMARY

The problems associated with investigating transition patterns between different types of user activities at a website are addressed by the disclosed embodiments.

In accordance with some embodiments, a method for categorizing multiple users of a website based on their respective transition patterns between different types of user activities is implemented at a computing device having one or more processors and memory. The memory stores one or more programs for execution by the one or more processors to perform the following operations: receiving one or more log files from a data source, wherein the log files include event records associated with multiple users of a website, each event record identifying a respective user activity at the website and having an event type; generating respective event transition matrixes for the multiple users, each respective event transition matrix being generated in accordance with a respective user's event records, wherein each element of each respective event transition matrix includes a probability of an occurrence of two consecutive event types A and B for the respective user; categorizing the multiple users into at least two distinct groups of users based on an analysis of the multiple users' event transition matrixes; and performing one or more operations to user accounts of the website that are associated with one or more users from one of the at least two distinct groups of users.

In accordance with some embodiments, a method for identifying an anomalous user among multiple users of a website based on their respective transition patterns between different types of user activities is implemented at a computing device having one or more processors and memory. The memory stores one or more programs for execution by the one or more processors to perform the following operations: receiving a log file and a log file update from a data source, wherein the log file includes event records associated with a user of a website during a first time period and the log file update includes event records associated with the user during a second time period (e.g., which is shorter than the first time period), each event record identifying a respective user activity at the website and having an event type; generating a first event transition matrix based on the user's event records in the log file and a second event transition matrix based on the user's event records in the log file update, wherein each element of the first and second event transition matrixes includes a probability of an occurrence of two consecutive event types A and B for the same user; determining a distance between the first and second event transition matrixes based on the probability differences between elements of the first event transition matrix and corresponding elements of the second event transition matrix; and performing one or more operations to the user's account at the website if the difference between the first and second event transition matrixes satisfies a criterion with respect to a predefined threshold (e.g., is less than the predefined threshold).

In accordance with some embodiments, a computer system for categorizing multiple users of a website based on their respective transition patterns between different types of user activities includes one or more processors and memory. The memory stores one or more programs for execution by the one or more processors to perform the following operations: receiving one or more log files from a data source, wherein the log files include event records associated with multiple users of a website, each event record identifying a respective user activity at the website and having an event type; generating respective event transition matrixes for the multiple users, each respective event transition matrix being generated in accordance with a respective user's event records, wherein each element of each respective event transition matrix includes a probability of an occurrence of two consecutive event types A and B for the respective user; categorizing the multiple users into at least two distinct groups of users based on an analysis of the multiple users' event transition matrixes; and performing one or more operations to user accounts of the website that are associated with one or more users from one of the at least two distinct groups of users.

In accordance with some embodiments, a non-transitory computer readable-storage medium stores one or more programs for execution by one or more processors of a computing device. The one or more programs include instructions for performing the following operations: receiving one or more log files from a data source, wherein the log files include event records associated with multiple users of a website, each event record identifying a respective user activity at the website and having an event type; generating respective event transition matrixes for the multiple users, each respective event transition matrix being generated in accordance with a respective user's event records, wherein each element of each respective event transition matrix includes a probability of an occurrence of two consecutive event types A and B for the respective user; categorizing the multiple users into at least two distinct groups of users based on an analysis of the multiple users' event transition matrixes; and performing one or more operations to user accounts of the website that are associated with one or more users from one of the at least two distinct groups of users.

Thus methods and systems are provided that derive useful information from a respective user's user activity records, and enable more effective management of the user's account at a website.

BRIEF DESCRIPTION OF DRAWINGS

The aforementioned embodiments of the inventions as well as additional embodiments will be more clearly understood as a result of the following detailed description when taken in conjunction with the drawings. Like reference numerals refer to corresponding parts throughout the several views of the drawings.

DESCRIPTION OF EMBODIMENTS

Reference will now be made in detail to embodiments, examples of which are illustrated in the accompanying drawings. While the inventions will be described in conjunction with the embodiments, it will be understood that the inventions are not limited to these particular embodiments. On the contrary, the inventions include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Figure 1:
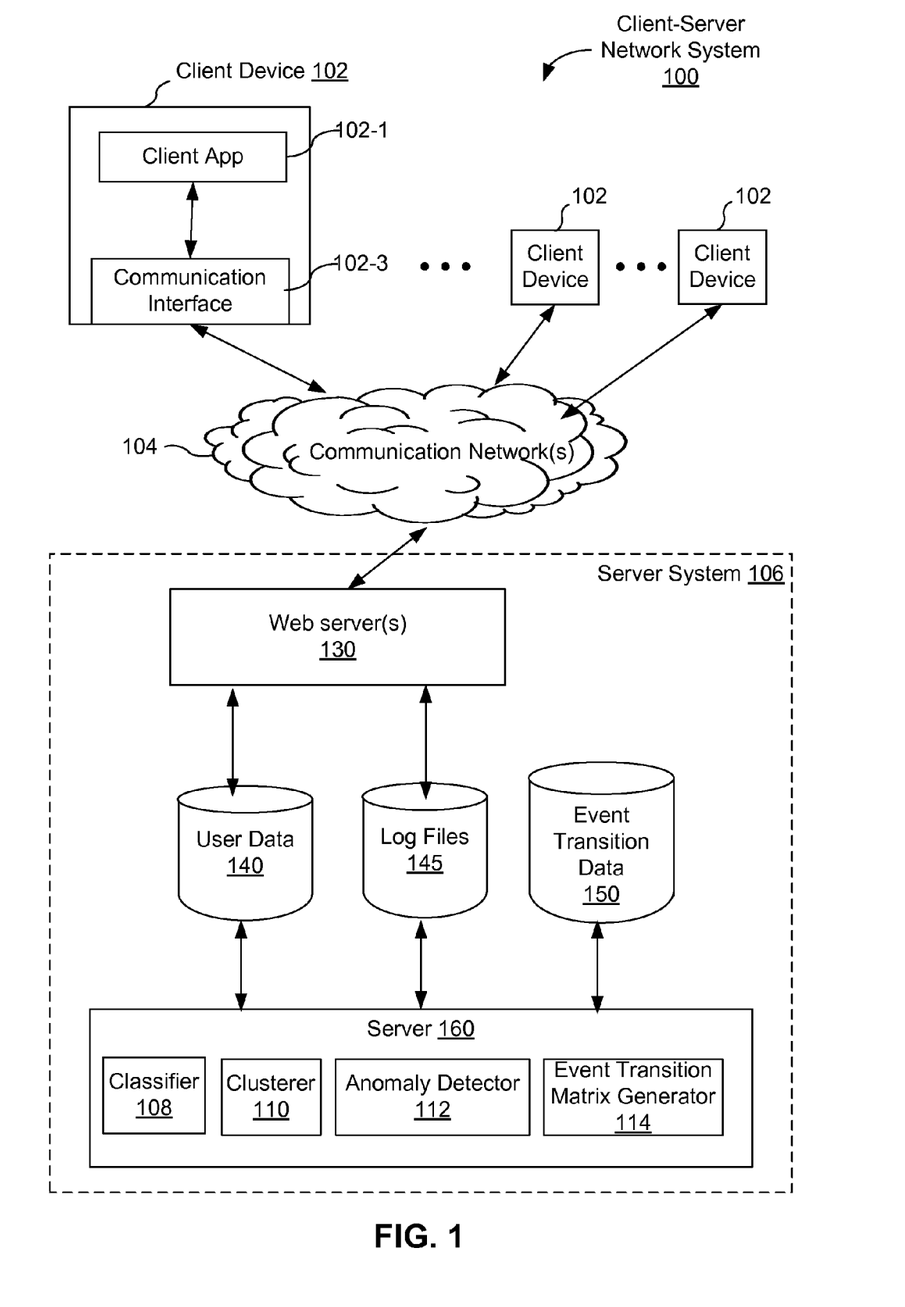
FIG. 1 is an overview block diagram of a client-server network system for analyzing a plurality of user activity records in accordance with some embodiments.

FIG. 1 is an overview block diagram of a client-server network system 100 for analyzing a plurality of user activity records in accordance with some embodiments. The system 100 may include one or more client devices 102 that are located remotely from a web server 130. A respective client device 102, sometimes called a client or client computer, may be a desktop computer, laptop computer, kiosk, mobile phone, personal digital assistant, or the like. A communication network 104 connects a client device 102 (or more specifically, a client device's communication interface 102-3) to the web server 130. A user at the client device 102 uses a client application 102-1 (e.g., a web browser) to submit a request to the web server 130. After interpreting the request, the web server 130 performs the user-requested operations and returns the user-requested service or data to the client device 102. Exemplary services provided by the web server 130 include enabling the user to login/logout of the user's account, issuing a cookie to the user, displaying a user-requested web page and content, storing content uploaded by the user, etc.

To render the services mentioned above, the web server 130 is typically connected to a plurality of data storage devices (e.g., databases). As shown in FIG. 1, one or more data storage devices 140 are used for storing user data ranging from the account information such as username/password and user profile, to user-related contents including blogs, photos, video/audio streams, etc. Another one or more data storage devices 145 are used for storing the log files generated by the web server 130 in connection with various user activities at the web server 130. In some embodiments, for each user-submitted request, the web server 130 generates one or more records, each record including multiple parameters such as the type of event, the timestamp of the event, etc. These records are stored in the log files in the data storage devices 145. As will be explained in detail below, these records may be used to characterize a respective user's behavior pattern at the website hosted by the web server 130. Yet another one or more data storage devices 150 are used for storing event transition data determined based on the records. In some embodiments, the data storage devices 140, 145, and/or 150 are combined into a single set of one or more data storage devices.

Figure 6:
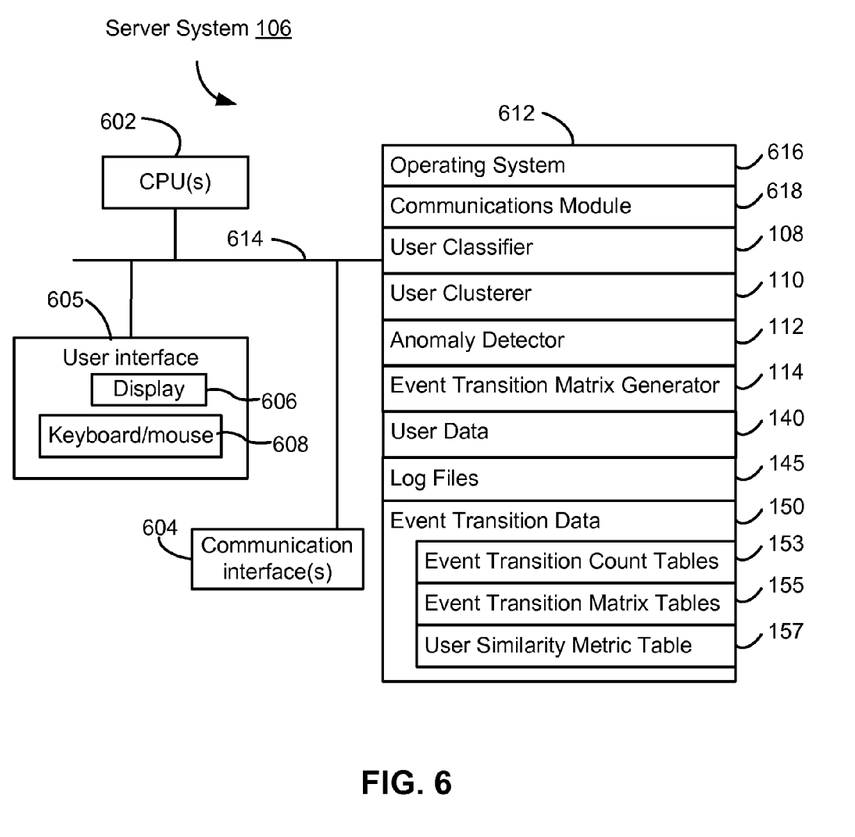
FIG. 6 is a block diagram of a computer system for processing a plurality of users' event records in accordance with some embodiments.

A back-end server 106, discussed further below, is coupled to the web server 130 and data storage devices 140, 145, and 150. Together, these devices constitute a server system 106. In some embodiments, the functions of the web server 130 and/or back-end server 106 may be divided or allocated among two or more servers. It should be appreciated that the server system 106 may be implemented as a distributed system of multiple computers. However, for convenience of explanation, the server system 106 is described below as being implemented on a single computer which can be considered a single logical system, as shown in FIG. 6.

Figure 2A:
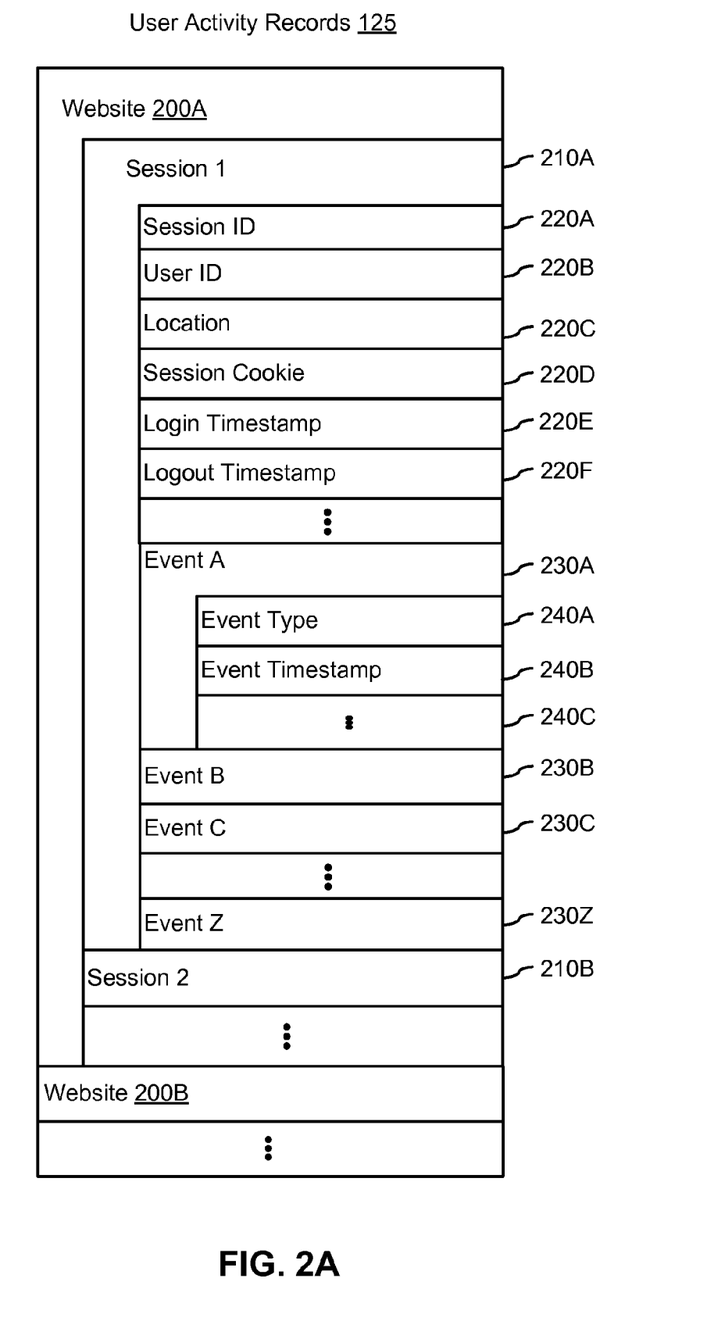
FIG. 2A is a block diagram illustrating a data structure used for storing user activity records (also known as "event records") at different websites in accordance with some embodiments.

FIG. 2A is a block diagram illustrating a data structure used for storing user activity or event records 125 in log files at different websites in accordance with some embodiments. In some embodiments, each record in the log files has many parameters, some of which are relevant to a user's behavior pattern and others are not. As shown in FIG. 2A, the event records 125 associated with a respective website (e.g., 200A or 200B) are grouped together. The records within a group are divided into different sessions (210A, 210B). Each session 210A has a unique session ID 220A, a user ID 220B indicating the user associated with the session 210A, a location 220C indicating the client device used by the user (which may be an IP address or a geographical location or a combination of both), a session cookie 220D (which is assigned to the user for a particular session), a login timestamp 220E indicating when the user logs into his or her account at the website 200A, and a logout timestamp 220F indicating when the user logs out of the account. In some embodiments, the records in the log files are not necessarily organized in the same way as shown in FIG. 2A. For example, the records in a log file may be stored in an order based on their respective occurrence timestamps. In this case, a log entry pre-processor (e.g., in the back-end server 106) may be used to process and re-order the records such that information relevant to detecting a user's behavior pattern is grouped together as shown in FIG. 2A.

In some embodiments, a session for a particular user includes one or more event records (230A, 230B, 230C, ..., 230Z) and each event record has one or more parameters such as event type 240A and event timestamp 240B indicating when the event occurred. In some embodiments, an event record may incorporate one or more additional features such as one or more of: the identity of user(s)/groups(s) referenced or contacted, the content referenced, the originating page/device/user interface, the geographical locations, etc. At a popular website, the web server may generate billions of event records each day. In Some embodiments, one way of controlling the data volume to be processed is to assign an event type to each event record. For example, a user account access event type is assigned to those event records like login, logout and cookie issuing, etc. A user profile management event type is associated with the user's visits to his or her user profile and updates to his or her user profile (e.g., change of user preference). A content generation event type is associated with user activities like uploading a photo, a video or audio stream, posting a blog or comment. A content visit event type is associated with user activities like visiting a web page owned by the user or somebody else. A content retrieval event type corresponds to those event records associated with user activities like downloading a picture or a video stream from a web page. A user communication event type is associated with user activities like sending a message to another user or inviting others to join the user's friend list. These event types are illustrative; many other event types such as emailing, rating, reviewing, sharing, tagging, etc., can be used to characterize a user's behavior pattern at a website.

In some embodiments, the logged event records may be aggregated into broader event categories for the purpose of event analysis, either by manually constructed mappings or by automatic methods such as clustering or dimensionality reduction. The event analysis partitions a large number of users into a limited number of categories of users, each category having a distinct user behavior pattern. For example, the assignment of an event type to an individual event record makes it possible to process the billions of event records at an event type level (e.g., by counting the total number of event records of a particular event type). In some embodiments, the number of event types for a particular website's event records ranges from multiple dozens to several hundreds depending on what granularity level is desired for understanding a user's behavior pattern (sometimes referred to as the user's signature or footprint when using the website's service). For example, focusing on a smaller number of event types allows users to be partitioned quickly into a limited number of categories of users, each category having a distinct user behavior pattern. In some examples, categories are based on the frequency and duration of sessions (e.g., one category corresponds to having at most one session per day with the session lasting for less than 20 minutes, etc.). In some embodiments, the users within a particular category are further divided into multiple sub-categories based on additional event types that may not be considered at the initial partitioning phase or based on multiple sub-types for an event type, thus revealing more subtle distinctions between the different sub-categories of users.

In some embodiments, besides the count of total event records of a particular event type, statistics regarding transitions from a first event type to a second event type (e.g., a consecutive occurrence of two events of event types A and B, respectively) provides additional and often more valuable insight into a user's behavior pattern. The event types A and B of the consecutive events may be the same event type or different event types. For example, a user visit to other users' photos is a common type of user activities at a social network website. But if the event records corresponding to a particular user (whether the user logs into his or her account or not) are predominantly comprised of the user's visits to others' photo web pages back to back without other types of event records in-between, this phenomenon may represent the fingerprint of an abnormal (or possibly malicious) user. In another example, a user usually needs to log into his account only once per session. Therefore, a high transition probability of two consecutive login event types for the same user may be related to a malicious attack on the web server. Therefore, the analysis of the event transitions between different types of event records can yield valuable information to protect a website and its normal users from potential network attacks.

Figure 2B:
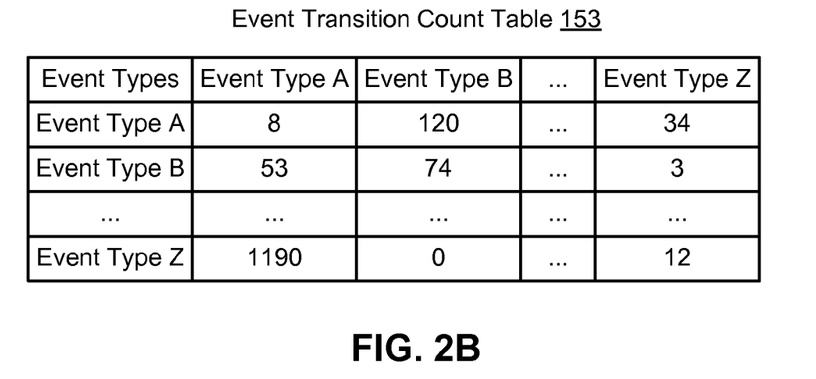
FIGS. 2B to 2C are block diagrams illustrating data structures used for converting a user's event records shown in FIG. 2A into an event transition matrix in accordance with some embodiments.
Figure 2C:
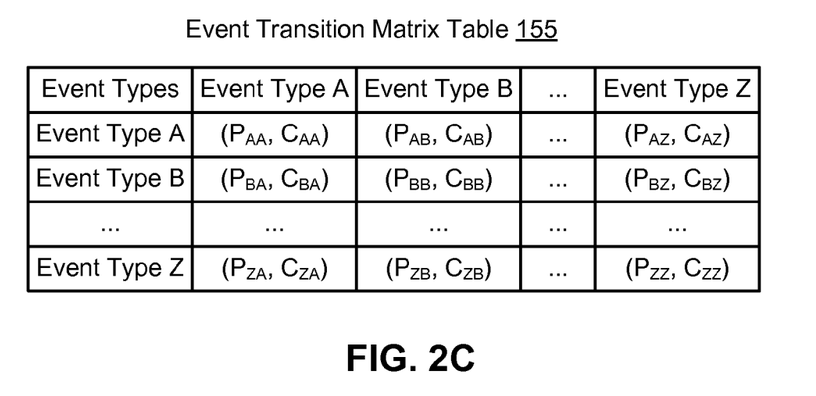

In some embodiments, the analysis of event transitions includes generating event transition matrixes (e.g., event transition matrix tables 155, FIG. 2C). Referring back to FIG. 1, a back-end server 106 is coupled to the user data storage devices 140 and the log file storage devices 145 to derive information from the event records therein. In some embodiments, an event transition matrix generator 114 within the server system 106 is responsible for generating one or more event transition matrixes for a respective user and storing them in the database 150. The server system 106 further includes modules like a classifier 108 and a clusterer 110 for partitioning the users of a website into different groups based at least in part on their respective event transition matrixes. In some embodiments, the server system 106 also includes an anomaly detection module 112 for capturing anomalous user activities as determined using the event transition matrixes. A more detailed description of these modules is provided below in connection with FIGS. 4A to 4C.

In some embodiments, the server system 106 (e.g., the event transition matrix generator 114 in the server 106) begins the event transition analysis by generating an event transition count table 153 (FIG. 2B) for a respective user using the event records shown in FIG. 2A. This 2-D table includes multiple rows and columns, each row or column corresponding to a event type, and the value for a respective pair of event types represents the count of the consecutive occurrence of the two event types for the user during a predefined time period, e.g., ranging from a hour to weeks. Each row and column intersects at a table entry that stores the count of consecutive occurrences of events of the type associated with the row followed by events of the type associated with the column. For example, FIG. 2B depicts that the count of consecutive occurrences of the event type A followed by another event type A is 8, the count of consecutive occurrences of the event type A followed by the event type B is 120, the count of consecutive occurrences of the event type B followed by the event type A is 53, and the count of consecutive occurrences of the event type Z followed by the event type B is 0. In some embodiments, the two event types within a pair are without an order. In this case, the corresponding two values in the event transition count table are determined by summing up the two counts of the two consecutive events occurring in opposite directions. For example, the entry at the intersection of the row for event type A and the column for the event type B would store a value of 173 (=120+53), as would the entry at the intersection of the row for event type B and the column for the event type A. The resulting table would correspond to a symmetrical matrix.

For a user who accesses a website through his or her user account, the user's event transition count table 153 is usually associated with a user ID and one or more session IDs corresponding to a predefined time window. In some embodiments, a website allows a user to access some of the services hosted by the website and submit requests for the services without logging into his or her account. In this case, the user's event transition count table 153 may be identified by an IP address, a sticky cookie stored at the user's browser, or using a technique like browser fingerprinting that can uniquely identify a client device from which the user requests arrive and a predefined time window that covers a group of event records associated with the client device.

The event transition count table 153 thus includes the absolute counts of the event transitions during the predefined time period. In some embodiments, the event transition matrix generator 114 converts these absolute values into probability values and stores the probability values in an event transition matrix table 155 (FIG. 2C) to allow comparisons of the behavior of different users. For example, the probability of the consecutive occurrence of the event type A followed the event type B is defined as follows:

$$Prob_{AB}(A \rightarrow B) = Count(A \rightarrow B)/Count(A \rightarrow *)$$

wherein Count(A->B) represents the count of the consecutive occurrence of the event type A followed the event type B; and Count(A->*) represents the count of the consecutive occurrence of the event type A followed any event type (including the event type B). In other words, the probability definition above simulates a user's behavior pattern in accordance with the following mathematical assumptions:

- Markov Chain - computing the probability of a user activity of event type B following a user activity of event type A if the user activity of event type B is assumed to be independent from any other user activities preceding the user activity of event type A;
- Maximum Likelihood Estimation - computing statistical model parameters that maximize the probability of the observed behavior, e.g., assuming the data follows a normal distribution and compute the mean and variance parameters that best fit the data; and
- Maximum a Posteriori Estimation - computing statistical model parameters that maximize the probability of the observed behavior, given a presumed prior model, to "smooth" the learned model and prevent overly strong decisions based on too little data.

According to the probability definition above, two users that have similar event transition probabilities for each pair of event types are deemed to have similar behavior patterns. One issue with this probability definition is that it gives no weight to the difference in the absolute number of counts between different users. As such, different users may have the same event transition probabilities according to this definition but quite different absolute counts of event types. For example, the table below depicts the event transition counts and probabilities from an event type A to event types B, C, D, respectively, for two users User_1 and User_2:

|  | User_1 | User_2 |
|---|---|---|
| A->B | 100 | 10 |
| A->C | 1100 | 110 |
| A->D | 200 | 20 |

Although the two users have the same event transition probabilities, the fact that the total count of event transitions for User_2 is merely 10% of the total count of event transitions for User_1 casts a doubt on the similarity between the two users' behavior patterns. As shown in FIG. 2C, a confidence level $C_{AB}$ is assigned to a particular event transition (A->B) such that a combination of ($P_{AB}$, $C_{AB}$) is used for characterizing the event transition for a particular user. In some embodiments, the confidence level $C_{AB}$ is defined as a function (e.g., a logarithmic function) of the total count of the event transition (A->B), the total count of event transitions (A->*), or a combination of both. In some other embodiments, the confidence level $C_{AB}$ is defined to be the total count of the event transition (A->B) or the total count of event transitions (A->*). Depending on the characteristics of the services offered by a website and the composition of its regular users, other models (e.g., based on probabilities of sets of three or more consecutive event types) that may be more accurate for characterizing user behavior are used.

Given that a user's behavior pattern is characterized by the user's event transition matrix table 155, it is possible to determine a similarity metric between two users based on their respective event transition matrixes. In some embodiments, the similarity metric between two users $U_1$ and $U_2$ is defined as follows:

$$Sim(U_1 U_2) = \sum_{E_i, E_j \in Event\_Types} \left(1 - e^{-\lambda \cdot min(C_{U_1}(E_i \rightarrow E_j), C_{U_2}(E_i \rightarrow E_j))}\right) \cdot$$

$$\left(\frac{P_{U_1}(E_i \rightarrow E_j) + P_{U_2}(E_i \rightarrow E_j)}{|P_{U_1}(E_i \rightarrow E_j) - P_{U_2}(E_i \rightarrow E_j)|}\right)$$

wherein the minimum of the two confidence levels $C_{u_1}(E_i \rightarrow E_j)$ and $C_{u_2}(E_i \rightarrow E_j)$ is used to weight the similarity between the two probability values $P_{u_1}(E_i \rightarrow E_j)$ and $P_{u_2}(E_i \rightarrow E_j)$ such that, the higher the confidence level is, the more weight is given to the similarity between the two probability values when determining the ultimate similarity metric between the two users' behavior patterns. $P_{u_1}(E_i \rightarrow E_j)$ and $P_{u_2}(E_i \rightarrow E_j)$ are the probabilities of transitions between events of types $E_i$ and $E_j$ for users $U_1$ and $U_2$ respectively, or in other words, the probabilities of occurrence of consecutive events of types $E_i$ and $E_j$ for users $U_1$ and $U_2$ respectively. The summation is performed over all permutations of transitions between event types. In some embodiments, the parameter "$\lambda$" in the formula above is chosen to be approximately 5. According to this particular definition of similarity metric, the higher the similarity metric value is, the more similar the two event transition matrixes and thus the two users' behavior patterns are and vice versa. Another similarity metric definition can be developed by, e.g., replacing the minimum function with the maximum function and reversing the nominator and denominator of the formula above. Such function defines a distance between two users in terms of their behavior patterns such that, the lower the similarity metric value, the smaller the distance between the two users and the more similar the two event transition matrixes (which represent the two users' behavior patterns) and vice versa. In some embodiments, other custom-built or common similarity metrics may be used such as cosine similarity, Kullback-Leibler divergence, earth mover's distance, kernel functions, etc.

Figure 2D:
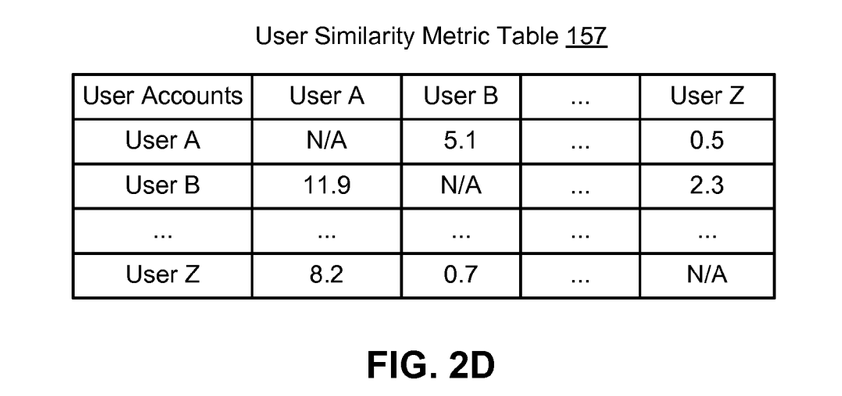
FIG. 2D is a block diagram illustrating a data structure used for storing the similarity metrics between different pairs of users of a website in accordance with some embodiments.

FIG. 2D is a block diagram illustrating a data structure 157, referred to as a user similarity metric table, used for storing the similarity metrics (e.g., $Sim(U_1, U_2)$) between different pairs of users of a website in accordance with some embodiments. The similarity metrics in the table 157 are normalized to be comparable with each other. There are different applications of these similarity metrics. For example, a cluster analysis of these similarity metrics and associated event transition matrixes 155 can divide the users into different subsets (or clusters) using, e.g., distributed hierarchical agglomerative clustering, parallel spectral clustering, or parallel latent Dirichlet allocation, etc. In some embodiments, each cluster has a centroid (or cluster center). From measuring the distance between a new event transition matrix and a respective cluster (e.g., its cluster center if there is a defined one), it is possible to determine to which cluster the user associated with the new event transition matrix belongs. In some embodiments, the cluster analysis is performed by the clusterer 110 (FIG. 1).

Figure 3:
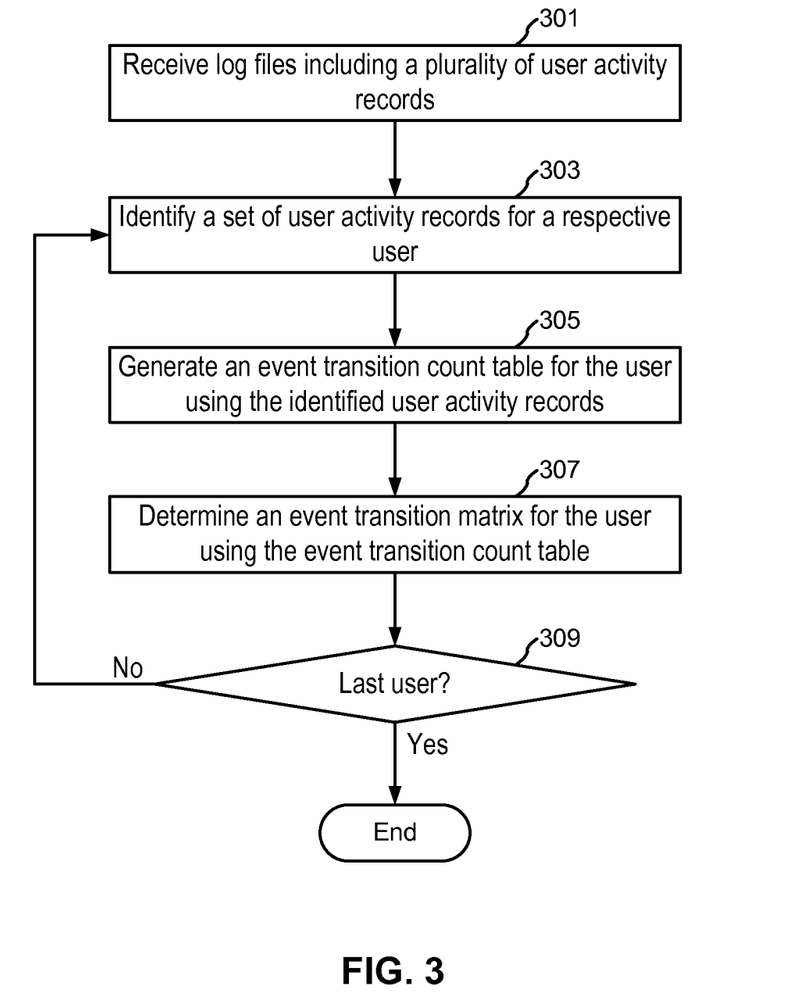
FIG. 3 is a flow diagram illustrating a process of converting a plurality of users' event records into event transition matrixes of the corresponding users in accordance with some embodiments.

FIG. 3 is a flow diagram illustrating a process of converting a plurality of users' event records (e.g., event records 230A-Z, FIG. 2A) into event transition matrixes 155 (FIG. 2C) of the corresponding users in accordance with some embodiments.

Upon receipt of one or more log files (301), the event transition matrix generator 114 orders the event transition records in the log files by their associated users and then identifies a set of event records for a particular user (303). For the identified set of event records, the event transition matrix generator 114 generates an event transition count table 153 as described above (305) and then determines an event transition matrix table 155 using the event transition count table 153 (307). The event transition matrix generator 114 repeats the process until the completion of the event records for the last user in the log files (309-yes). These event transition matrixes 155 are then used by other modules (e.g., the classifier 108, clusterer 110, and anomaly detector 112, FIG. 1) to characterize and compare user behavior.

Figure 4A:
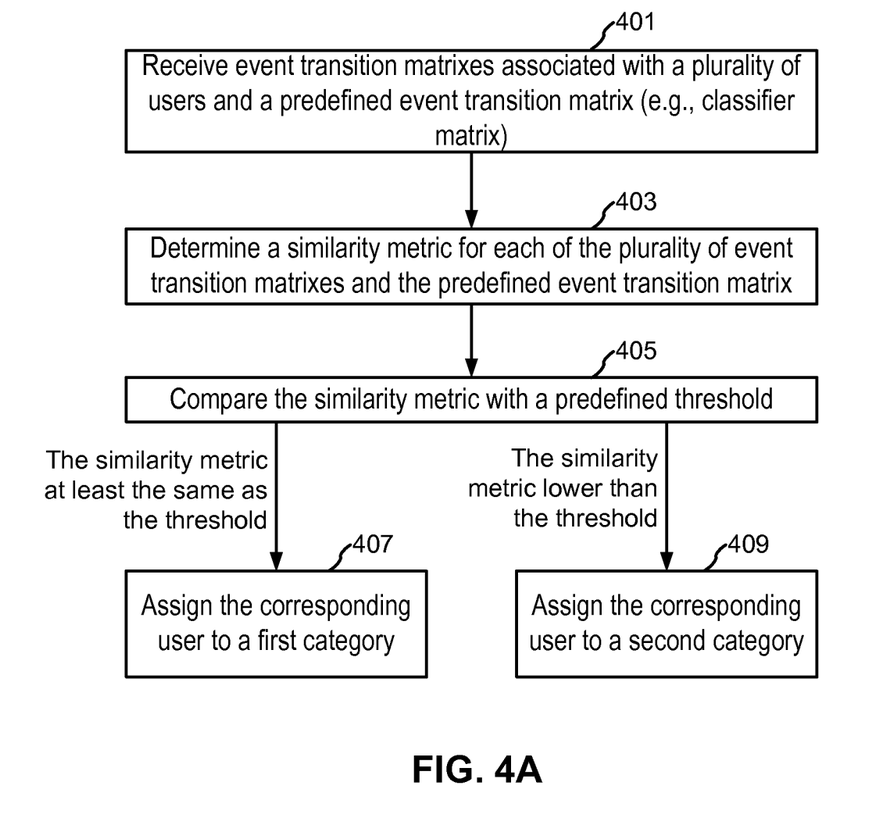
FIGS. 4A to 4C are flow diagrams illustrating processes of dividing a plurality of users of a website into different categories or identifying anomalous users therein using their respective event transition matrixes in accordance with some embodiments.

In particular, FIG. 4A is a flow diagram illustrating a process of the classifier 108 (FIG. 1) classifying a plurality of users of a website into two or more categories in accordance with some embodiments. The classifier 108 retrieves (401) the users' associated event transition matrixes 155 (FIG. 2C) from the database 150 (FIG. 1). In some embodiments, the classifier 108 also receives a predefined event transition matrix (e.g., a classifier matrix). This classifier matrix represents a typical (and often hypothetical) user's behavior pattern for a predefined group of users and the classifier 108's responsibility is to determine, among the plurality of users, whose behavior pattern is sufficiently close to this typical user's behavior pattern to be included in a category associated with the classifier matrix. In some embodiments, the classifier matrix above may be replaced with any "learner model" that takes user logs as input and outputs a category. There are many known techniques of generating the categories, one of which is referred to as "supervised learning." Supervised learning is a machine learning technique for deducing a prediction function from a training dataset that consists of event transition matrixes corresponding to known user behavior patterns and desired outputs. The output of the prediction function can predict a category of any input event transition matrix after the function's coefficients have been modulated using the training dataset. For example, a labeled training set N consisting of a plurality of event transitions matrixes is created, each with an associated category obtained by manual or semi-automated labeling of instances. This labeled training set N is used to train the classifier 108 that takes as input a user's event transition matrix and outputs a category. Training occurs by optimizing a set of classifier parameters such that the classifier 108 gives high-accuracy predictions of the category for each labeled instance. The classifier 108 can then be used to classify new instances not found in the labeled training set. Examples of classifiers include k-nearest neighbors, support vector machines, graphical models, and neural networks.

In this example, the predefined classifier matrix and a predefined threshold are equivalent to a prediction function. The classifier 108 determines a similarity metric between each of the plurality of event transition matrixes and the predefined classifier matrix (403) and then compares the similarity metric with the predefined threshold (405). If the similarity metric is the same or above the threshold (or alternatively the same as or below the threshold, depending on the definition of the similarity metric), the classifier 108 then puts the user associated with the event transition matrix in a first category (407). Otherwise, the classifier 108 puts the corresponding user in a second category (409). In some embodiments, if the classifier matrix represents a potentially malicious user behavior pattern, this classification process can determine with some confidence which of the multiple users may be a malicious user. In some embodiments, the classifier 108 reports the classification result to another module associated with the web server 130, which takes necessary actions to protect against these potentially malicious users, e.g., disabling or restricting their access to the website. In some embodiments, this approach is very useful when the behavior pattern of one type of malicious users can be accurately characterized by the classifier matrix.

Figure 4B:
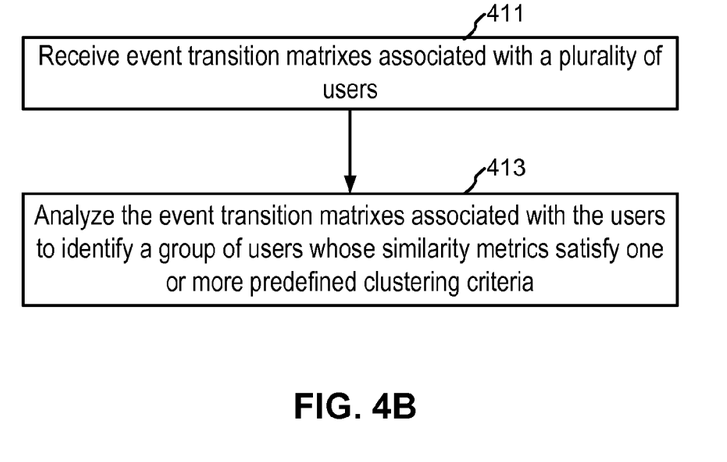

FIG. 4B is a flow diagram illustrating a process of the clusterer 110 (FIG. 1) dividing a plurality of users of a website into different categories using their respective event transition matrixes 155 (FIG. 2C) in accordance with some embodiments. Upon receipt of a plurality of event transition matrixes (411), the clusterer 110 analyzes the plurality of event transition matrixes so as to identify a group of users that satisfy one or more predefined criteria (413). In some embodiments, a clusterer takes the event transition matrixes of the users as inputs and groups them together into clusters of users, usually based on a similarity function (see the examples listed above). In this case, there are no predefined clusters or labeled data set. Clusters are automatically determined by the clusterer. Examples of clustering algorithms include k-means, hierarchical agglomerative clustering, mixture models, and graphical models. The users are clustered by running them through the clusterer or by computing their similarity to some representative member(s) of each cluster.

A similarity between the classifier 108 and the clusterer 110 is that they compare the event transition matrixes 155 (FIG. 2C) associated with different users (including a hypothetical user represented by the classifier matrix) and then group the users according to the comparison results. In some embodiments, a comparison between two event transition matrixes associated with the same user but at different time scales is helpful to detect whether a user has demonstrated any abnormal activity pattern. This approach is especially useful for tracking down network attacks that are launched from hijacked users' accounts.

Figure 4C:
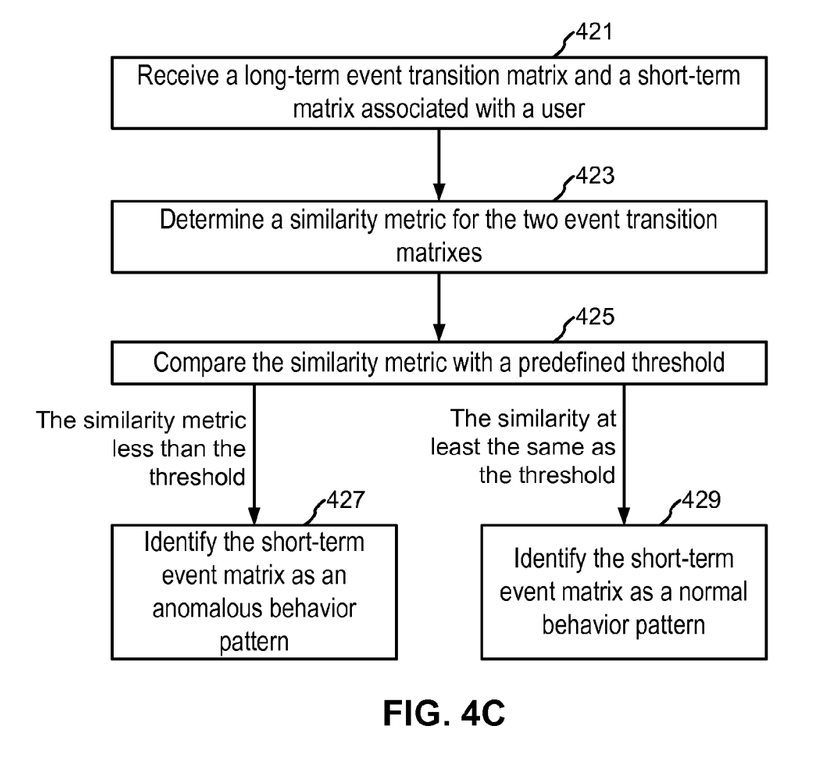

FIG. 4C is a flow diagram illustrating a process of the anomaly detector 112 (FIG. 1) identifying anomalous user activities using event transition matrixes 155 (FIG. 2C) of different time scales in accordance with some embodiments. In some embodiments, the anomaly detector 112 has a long-term (e.g., the last two weeks) event transition matrix and a short-term (e.g., the last day) event transition matrix associated with the same user (421). The anomaly detector 112 determines a similarity metric for the two event transition matrixes (423) and compares the similarity metric with a predefined threshold (425). For example, the anomaly detector 112 calculates $Sim(U_1,U_2)$, where $U_1$ and $U_2$ now refer to the long-term matrix and the short term matrix, respectively. When the similarity metric between the two matrixes is less than the threshold (or alternatively is greater than the threshold, depending on the definition of the similarity metric), indicating that there is a substantial difference between the two event transition matrixes, the anomaly detector 112 then identifies the short-term event transition matrix as an anomalous behavior pattern (427). Otherwise, the anomaly detector 112 identifies the short-term event transition matrix as representing a normal behavior pattern (429). In some embodiments, this process is combined with or is part of the normal update of the event transition matrixes of different users by the server system 106 as described below in connection with FIG. 5. In some embodiments, the anomaly detector 112 reports identification of an anomalous behavior pattern to a module associated with the web server 130, which takes action to protect against potentially malicious behavior by the corresponding user, e.g., by disabling or restricting the user's access to the website.

Figure 5:
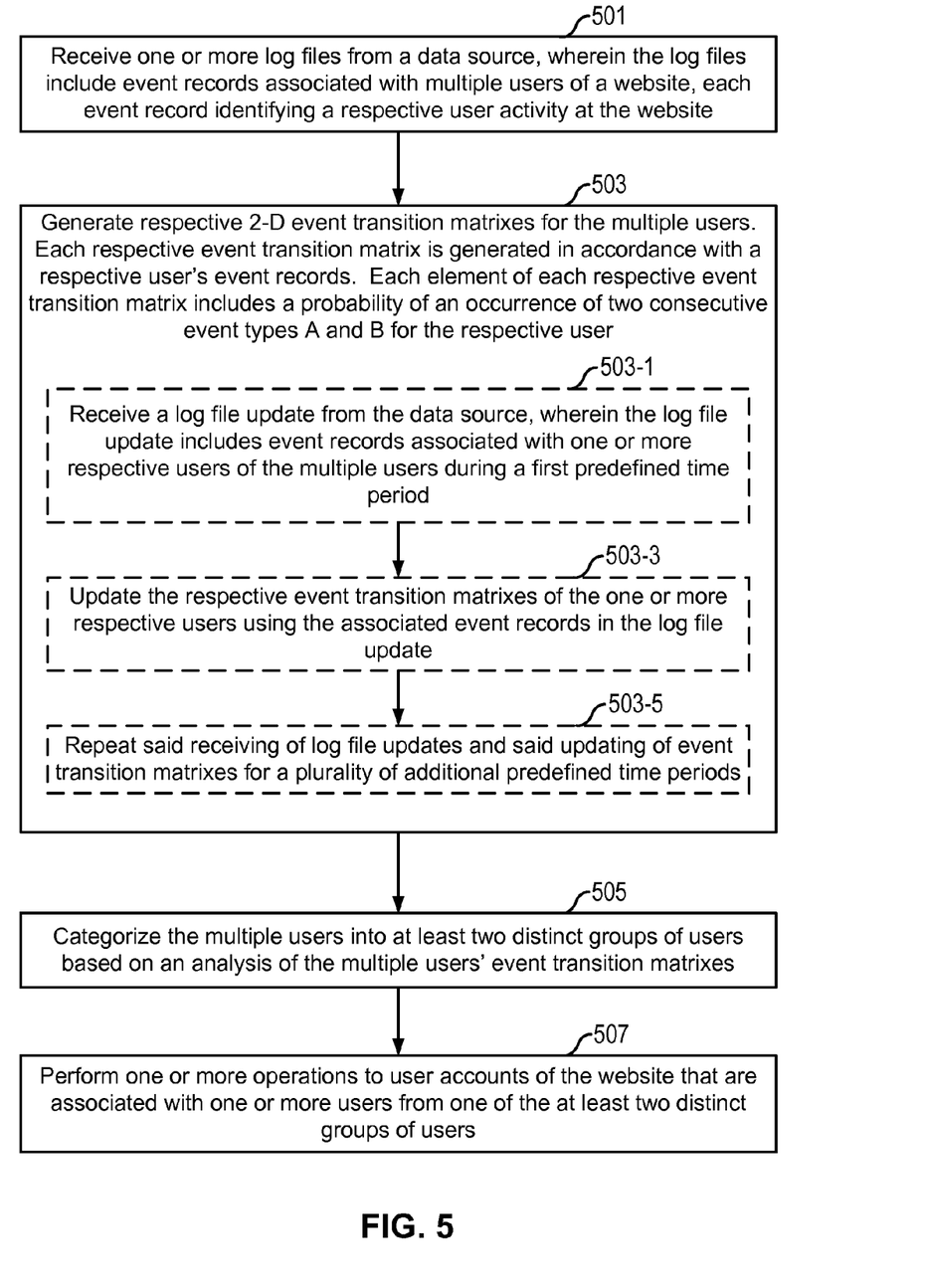
FIG. 5 is a flow diagram illustrating a process of deriving event transition matrixes from a plurality of users' event records and using the event transition matrixes to categorize the users in accordance with some embodiments.

FIG. 5 is a flow diagram illustrating a process of deriving event transition matrixes from a plurality of users' event records and using the event transition matrixes to categorize the users in accordance with some embodiments. In some embodiments, the process is implemented at a computing device having one or more processors and memory (e.g., the server system 106, FIG. 1, or one or more components thereof).

Initially, the computing device receives (501) one or more log files from a data source (e.g., the log file storage devices 145). In some embodiments, the log files include event records (e.g., event records 230A-Z, FIG. 2A) associated with multiple users of a website and each event record identifies a user activity at the website and has an event type (e.g., event type 240A, FIG. 2A). The computing device generates respective 2-D event transition matrixes (e.g., event transition matrix tables 155, FIG. 2C) for the multiple users. Each respective event transition matrix is generated in accordance with a respective user's event records (503). In particular, each element of each respective event transition matrix includes a probability of an occurrence of two consecutive event types A and B for the respective user. Based on an analysis of the multiple users' event transition matrixes, the computing device categorizes the multiple users into at least two distinct groups of users (505) and performs one or more operations to user accounts of the website that are associated with one or more users from one of the at least two distinct groups of users (507), such as restricting access to the website by a respective group of users of the at least two distinct groups of users.

In some embodiments, at the end of a predefined time period (e.g., one day), the computing device receives from the data source a log file update including event records associated with one or more users of the website during the predefined time period (503-1). The computing device uses the event records within the log file update to update the event transition matrixes associated with different users (503-3). The computing device repeats the receiving of log file updates and the updating of the event transition matrixes for a certain time period (e.g., two or three weeks) (e.g., corresponding to a plurality of predefined time periods) (503-5) and then re-categorizes the users associated with the event transition matrixes. This re-categorization may cause one or more users who used to be affiliated with one group to become members of another group if the event records in the log file updates change the users' behavior patterns.

In some embodiments, each row and column of a respective event transition matrix corresponds to a distinct event type selected from the group consisting of user account access, user profile management, content generation, content visit, content retrieval, and user communication, such as emailing, rating, reviewing, sharing, tagging, etc.

In some embodiments, the probability of the occurrence of the two consecutive event types A and B for a respective user is, at least in part, dependent on a count of the occurrence of the two consecutive event types A and B during a predefined time period (e.g., as stored in an event transition count table 153, FIG. 2B) divided by a count of the occurrence of the event type A during the same predefined time period.

In some embodiments, the probability of the occurrence of the two consecutive event types A and B for the respective user has an associated confidence level that is, at least in part, dependent on the count of the occurrence of the two consecutive event types A and B during the predefined time period.

In some embodiments, the analysis includes determining a similarity metric (e.g., $Sim(U_1,U_2)$) between first and second event transition matrixes based on the probability differences between elements of the first event transition matrix and corresponding elements of the second event transition matrix, each respective probability difference being an absolute difference between a first probability at an element of the first event transition matrix and a second probability at a corresponding element of the second event transition matrix and each probability corresponding to a respective pair of consecutive event types. The similarity metric is stored, for example, in a corresponding entry of a user similarity metric table 157, FIG. 2D).

In some embodiments, a respective probability difference is weighted by at least one (e.g., the minimum) of a confidence level for the first probability and a confidence level for the second probability.

In some embodiments, the computing device determines a similarity metric between a respective user's event transition matrix and a predefined event transition matrix. (e.g., a classifier matrix) The predefined event transition matrix is configured to represent a malicious attack of the website. Next, the computing device identifies the respective user as being associated with the malicious attack if the determined similarity metric satisfies a predefined criterion with respect to a predefined threshold (e.g., is less than the predefined threshold).

In some embodiments, for each pair of a first user and a second user of the multiple users, the computing device determines a similarity metric (e.g., $Sim(U_1,U_2)$) between the first user's event transition matrix and the second user's event transition matrix and analyzes the similarity metrics associated with different pairs of users. These similarity metrics are stored, for example, in corresponding entries of a user similarity metric table 157 (FIG. 2D). In accordance with the analysis of the similarity metrics, the computing device identifies a group of users whose similarity metrics satisfy one or more predefined clustering criteria.

FIG. 6 is a block diagram of a computer server system 106 (FIG. 1) for processing a plurality of users' event records (e.g., event records 230A-Z, FIG. 2) in accordance with some embodiments. The server system 106 includes one or more processing units (CPU's) 602, one or more network or other communications interfaces 604, user interface 605 (including a display 606 and a keyboard or mouse 608), memory 612, and one or more communication buses 614 for interconnecting these components. The communication buses 614 may include circuitry (sometimes called a chipset) that interconnects and controls communications between system components.

Memory 612 may include high speed random access memory and may also include non-volatile memory, such as one or more magnetic or optical storage disks, flash memory devices, or other non-volatile solid state storage devices. The high speed random access memory may include memory devices such as DRAM, SRAM, DDR RAM or other random access solid state memory devices. Memory 612 may optionally include mass storage that is remotely located from CPU's 602. Memory 612, or alternately the non-volatile memory device(s) within memory 612, comprises a non-transitory computer readable storage medium. In some embodiments, memory 612 includes the one or more storage devices 140, 145, and 150 (FIG. 1). Memory 612 or the computer readable storage medium of memory 612 stores the following elements, or a subset of these elements, and may also include additional elements:

- an operating system 616 that includes procedures for handling various basic system services and for performing hardware dependent tasks;

a network communication module (or instructions) 618 that is used for connecting the server system 106 to other computers via the one or more communications network interfaces 604 and one or more communications networks, such as the Internet, other wide area networks, local area networks, metropolitan area networks, and so on;

a user classifier module 108 (FIG. 1) for classifying a plurality of users into two or more categories in accordance with their event transition matrixes;

a user clusterer module 110 (FIG. 1) for clustering a plurality of users into two or more categories in accordance with their event transition matrixes;

an anomaly detector module 112 (FIG. 1) for detecting anomalous user activities in accordance with their event transition matrixes;

an event transition matrix generator module 114 (FIG. 1) for generating an event transition matrix for a respective user of a website based on the user's event transition records;

user data (e.g., as stored in the one or more storage devices 140, FIG. 1);

one or more log files (e.g., as stored in the one or more storage devices 145, FIG. 1) for storing records that track user activities at a website;

a plurality of event transition matrixes 155 (FIG. 2C) (e.g., as stored in the one or more storage devices 150, FIG. 1);

a plurality of event transition count tables 153 (FIG. 2B) (e.g., as stored in the one or more storage devices 150, FIG. 1); and one or more user similarity metrics tables 157 (FIG. 2D) (e.g., as stored in the one or more storage devices 150, FIG. 1).

Although some of the various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:

at a computing system having one or more processors and memory storing programs executed by the one or more processors:

accessing event records associated with multiple users of a website, each event record identifying a respective user activity at the website and having an associated event type;

generating a respective event transition matrix for each of the multiple users, each respective event transition matrix being generated in accordance with a respective user's event records;

wherein each element of each respective event transition matrix includes a probability of an occurrence of two consecutive event types A and B for the respective user;

wherein at least one element of each respective event transition matrix corresponds to two distinct event types;

wherein event type A has occurred at least once during a predefined time period; and wherein the probability of the occurrence of the two consecutive event types A and B for a respective user is, at least in part, dependent on a count of the occurrence of the two consecutive event types A and B during the predefined time period divided by a count of the occurrence of the event type A during the predefined time period;

categorizing the multiple users into at least two distinct groups of users based on an analysis of the multiple users' event transition matrixes; and performing one or more operations to user accounts of the website, the user accounts being associated with one or more users from one of the at least two distinct groups of users.

2. The method of claim 1, wherein the event transition matrixes are two- dimensional.

3. The method of claim 1, wherein categorizing the multiple users further includes:

accessing additional event records associated with one or more respective users of the multiple users during a first predefined time period;

updating the respective event transition matrixes of the one or more respective users using the additional event records;

repeating said receiving and updating for a plurality of additional predefined time periods; and re-categorizing one or more of the multiple users using one or more of the updated event transition matrixes.

4. The method of claim 1, wherein each row and column of a respective event transition matrix corresponds to a distinct event type selected from the group consisting of user account access, user profile management, content generation, content visit, content retrieval, and user communication.

5. The method of claim 1, wherein the probability of the occurrence of the two consecutive event types A and B for the respective user has an associated confidence level that is, at least in part, dependent on the count of the occurrence of the two consecutive event types A and B during the predefined time period.

6. The method of claim 1, wherein the analysis includes determining a similarity metric between first and second event transition matrixes based on the probability differences between elements of the first event transition matrix and corresponding elements of the second event transition matrix, each respective probability difference being an absolute difference between a first probability at an element of the first event transition matrix and a second probability at a corresponding element of the second event transition matrix and each probability corresponding to a respective pair of consecutive event types.

7. The method of claim 6, wherein a respective probability difference is weighted by at least one of a confidence level for the first probability and a confidence level for the second probability.

8. The method of claim 6, wherein a respective probability difference is weighted by a minimum of a confidence level for the first probability and a confidence level for the second probability.

9. The method of claim 1, wherein categorizing the multiple users comprises:

determining a similarity metric between a respective user's event transition matrix and a predefined event transition matrix, wherein the predefined event transition matrix is configured to represent a malicious attack of the website; and identifying the respective user as being associated with the malicious attack if the determined similarity metric satisfies a criterion with respect to a predefined threshold.

10. The method of claim 9, wherein the criterion specifies that the similarity metric is greater than the predefined threshold.

11. The method of claim 1, wherein categorizing the multiple users comprises:
for each pair of a first user and a second user of the multiple users, determining a similarity metric between the first user's event transition matrix and the second user's event transition matrix;
analyzing the similarity metrics associated with different pairs of users; and
in accordance with the analysis of the similarity metrics, identifying a group of users whose similarity metrics satisfy one or more predefined clustering criteria.

12. The method of claim 1, wherein performing the one or more operations comprises restricting access to the website by a respective group of users of the at least two distinct groups of users.

13. The method of claim 1, wherein the website is a social network website.

14. The method of claim 1, wherein the analysis includes determining a similarity metric between first and second event transition matrixes based on the probability differences between elements of the first event transition matrix and corresponding elements of the second event transition matrix.

15. A computer system, comprising:
one or more processors; and
memory storing one or more programs configured for execution by the one or more processors to perform the following operations:
accessing event records associated with multiple users of a website, each event record identifying a respective user activity at the website and having an event type;
generating a respective event transition matrix for each of the multiple users, each respective event transition matrix being generated in accordance with a respective user's event records;
wherein each element of each respective event transition matrix includes a probability of an occurrence of two consecutive event types A and B for the respective user;
wherein at least one element of each respective event transition matrix corresponds to two distinct event types;
wherein event type A has occurred at least once during a predefined time period; and
wherein the probability of the occurrence of the two consecutive event types A and B for a respective user is, at least in part, dependent on a count of the occurrence of the two consecutive event types A and B during the predefined time period divided by a count of the occurrence of the event type A during the predefined time period;
categorizing the multiple users into at least two distinct groups of users based on an analysis of the multiple users' event transition matrixes; and
performing one or more operations to user accounts of the website, the user accounts being associated with one or more users from one of the at least two distinct groups of users.

16. The system of claim 15, wherein categorizing the multiple users further includes:
accessing additional event records associated with one or more respective users of the multiple users during a first predefined time period;
updating the respective event transition matrixes of the one or more respective users using the additional event records;
repeating said receiving and updating for a plurality of additional predefined time periods; and
re-categorizing one or more of the multiple users using one or more of the updated event transition matrixes.

17. The system of claim 15, wherein each row and column of a respective event transition matrix corresponds to a distinct event type selected from the group consisting of user account access, user profile management, content generation, content visit, content retrieval, and user communication.

18. The system of claim 15, wherein the analysis includes determining a similarity metric between first and second event transition matrixes based on the probability differences between elements of the first event transition matrix and corresponding elements of the second event transition matrix, each respective probability difference being an absolute difference between a first probability at an element of the first event transition matrix and a second probability at a corresponding element of the second event transition matrix and each probability corresponding to a respective pair of consecutive event types.

19. The system of claim 18, wherein a respective probability difference is weighted by at least one of a confidence level for the first probability and a confidence level for the second probability.

20. A non-transitory computer-readable storage medium storing one or more programs for execution by one or more processors of a computing system, the one or more programs comprising instructions for:
accessing event records associated with multiple users of a website, each event record identifying a respective user activity at the website and having an event type;
generating a respective event transition matrix for each of the multiple users, each respective event transition matrix being generated in accordance with a respective user's event records;
wherein each element of each respective event transition matrix includes a probability of an occurrence of two consecutive event types A and B for the respective user;
wherein at least one element of each respective event transition matrix corresponds to two distinct event types;
wherein event type A has occurred at least once during a predefined time period; and
wherein the probability of the occurrence of the two consecutive event types A and B for a respective user is, at least in part, dependent on a count of the occurrence of the two consecutive event types A and B during the predefined time period divided by a count of the occurrence of the event type A during the predefined time period;
categorizing the multiple users into at least two distinct groups of users based on an analysis of the multiple users' event transition matrixes; and
performing one or more operations to user accounts of the website, the user accounts being associated with one or more users from one of the at least two distinct groups of users.

21. The storage medium of claim 20, wherein categorizing the multiple users further includes:

accessing additional event records associated with one or more respective users of the multiple users during a first predefined time period;

updating the respective event transition matrixes of the one or more respective users using the additional event records;

repeating said receiving and updating for a plurality of additional predefined time periods; and re-categorizing one or more of the multiple users using one or more of the updated event transition matrixes.

22. The storage medium of claim 20, wherein each row and column of a respective event transition matrix corresponds to a distinct event type selected from the group consisting of user account access, user profile management, content generation, content visit, content retrieval, and user communication.

23. The storage medium of claim 20, wherein the analysis includes determining a similarity metric between first and second event transition matrixes based on the probability differences between elements of the first event transition matrix and corresponding elements of the second event transition matrix, each respective probability difference being an absolute difference between a first probability at an element of the first event transition matrix and a second probability at a corresponding element of the second event transition matrix and each probability corresponding to a respective pair of consecutive event types.

24. The storage medium of claim 23, wherein a respective probability difference is weighted by at least one of a confidence level for the first probability and a confidence level for the second probability.

* * * * *